United States Patent
Schippl

[19]
[11] Patent Number: 5,996,638
[45] Date of Patent: Dec. 7, 1999

[54] SPACER BLOCK FOR AN ELONGATED SUBSTRATE

[75] Inventor: Klausdieter Schippl, Hannover, Germany

[73] Assignee: Alcatel, Paris, France

[21] Appl. No.: 09/040,018

[22] Filed: Mar. 17, 1998

[30] Foreign Application Priority Data

Mar. 19, 1997 [DE] Germany .............. 197 11 373

[51] Int. Cl.⁶ .................................................. F16L 9/19
[52] U.S. Cl. ................ 138/112; 138/108; 138/113; 138/114
[58] Field of Search ................... 138/108, 112, 138/113, 114

[56] References Cited

U.S. PATENT DOCUMENTS

| | | | |
|---|---|---|---|
| 2,914,090 | 11/1959 | Isenberg . | |
| 2,930,407 | 3/1960 | Conley et al. | 138/114 |
| 3,250,297 | 5/1966 | Mooneyham | 138/113 |
| 3,595,275 | 7/1971 | Steans et al. | 138/114 |
| 3,621,109 | 11/1971 | Nakata | 138/112 |
| 3,789,129 | 1/1974 | Ditschied | 138/113 |
| 3,835,240 | 9/1974 | Matthäus | 138/113 |
| 3,891,006 | 6/1975 | Lee | 138/112 |
| 4,036,617 | 7/1977 | Leonard et al. | 138/112 |
| 4,122,298 | 10/1978 | Brandt | 138/112 |
| 5,860,453 | 1/1999 | Picking | 138/108 |

FOREIGN PATENT DOCUMENTS

| | | |
|---|---|---|
| 116915 | 12/1975 | Germany . |
| 3144857 | 5/1983 | Germany . |
| 2136176 | 12/1983 | Germany . |
| 58-137205 | 8/1983 | Japan . |
| 62-067803 | 3/1987 | Japan . |
| 6260329 | 9/1994 | Japan . |

*Primary Examiner*—James F. Hook
*Attorney, Agent, or Firm*—Ware, Fressola, Van der Sluys & Adolphson LLP

[57] ABSTRACT

A spacer block (3) for an elongated substrate (1) on the inside of an elongated tube (2) comprises an internal ring (3a) which surrounds the elongated material, an external ring (3b) which is surrounded by the elongated tube (2), where the outside diameter of the internal ring (3a) is smaller than the inside diameter of the external ring (3b), and the internal and the external ring (3a, 3b) are interconnected by at least three spoke-type elements (3c) made of fiber material, which are uniformly spaced around the circumference.

9 Claims, 3 Drawing Sheets

SPACER BLOCK FOR AN ELONGATED SUBSTRATE

BACKGROUND OF THE INVENTION

1. Field of the Invention

The invention concerns a spacer block for an elongated substrate on the inside of an elongated tube, as well as a coaxial tube system with such a spacer block.

The invention begins with the following idea: An optimum thermal insulation for cryogenics is achieved by a multilayer foil insulation in high vacuum (superinsulation). By minimizing the components $Q_{Gas}$, $Q_{FK}$ and $Q_{Rad}$, the total heat flow is thereby brought to the lowest possible technical value so far. The heat loss flows $Q_{Gas}$ are reduced by creating a vacuum in the insulation space.

The solid heat bridges created by spacer blocks e.g., which are responsible for $Q_{FK}$, are constructively reduced by minimizing the solid-state contact flows.

The radiation losses $Q_{Rad}$ are reduced by mirror-coating the internal walls or by installing highly reflective foils.

Especially with flexible, vacuum-insulated cryogenic conduits, $Q_{FK}$ plays a decisive role. In order for the cold internal tube not to have any direct contact with the external tube which is at room temperature, spacer blocks were used in various constructions until now. They must be able to transmit as large a force component as possible, but must have the characteristics of low thermal conductivity in the same measure. The known spacer blocks have the disadvantage that they do not attain the two required targets to the same degree. If a low thermal conductivity was attained, the mechanical load capacity was small; with a high mechanical load capacity, a very high thermal conductivity had to be taken into consideration.

2. Description of the Prior Art

A tube system made up of two concentric tubes is known from DE-C2-2 136 176, e.g. an electrical cable which operates at deep temperatures, or a tube line for transporting heated or cooled liquid or gaseous media, where the internal tube is kept in position inside the surrounding external tube by spacer blocks having a small volume or mass. The spacer blocks are spaced on the internal tube and are supported by the inside surface of the external tube. The spacer block comprises several slotted rings, where the slot width corresponds to the diameter of the internal tube. A thread element is attached to the slot area of each ring. The rings are interconnected in a way so that they can swivel around a common axis of rotation. When the spacer block is installed on the internal tube, the thread elements lay partly around the internal tube. The external tube is supported by the outside circumference of the spacer block which is formed of the rings. This construction is very small in volume or mass. However, since it is difficult to attach the thread elements to the rings permanently, and the attachment can loosen under a tension stress, this spacer block is less suited for flexible tube systems, because tension or pressure stresses of more than 10,000 N can occur when such flexible tube systems are bent.

SUMMARY OF THE INVENTION

An object of the invention is therefore to provide a spacer block which has a small volume or mass and therefore exhibits good heat insulation characteristics, and is also able to withstand high tension stresses.

The invention will be fully understood when reference is made to the following detailed description taken in conjunction with the accompanying drawings.

DETAILED DESCRIPTION OF THE INVENTION

Figure 1:
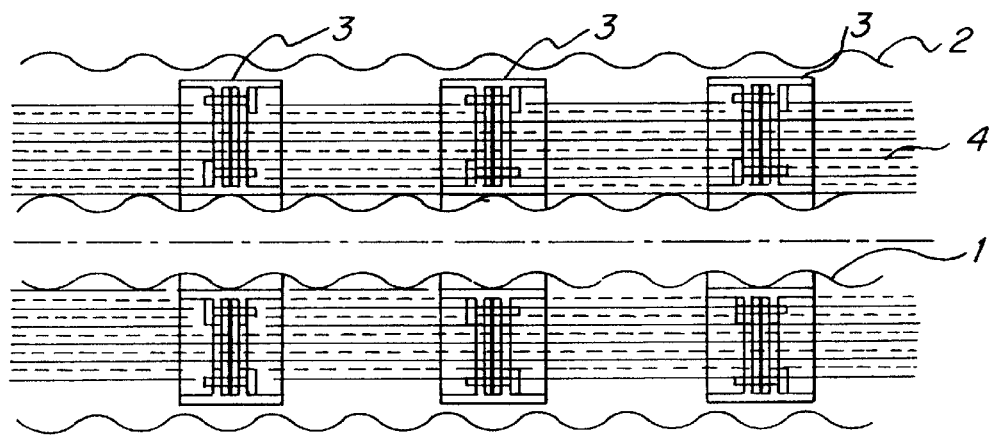
FIG. 1 is a longitudinal cross-sectional view of a tubing system which is preferably suitable for transporting cryogenic liquids or gases. As an alternative, this can also be a superconductor cable.

Referring to FIG. 1, a tubing system comprises an internal tube 1 made of a corrugated metal tube, and an external tube 2 which is also a corrugated metal tube. The internal tube 1 is kept concentric with the external tube 2 by means of spacer blocks 3. The spacer blocks 3 are annular and are arranged on the internal tube 1 at a lengthwise axial distance from each other. The area between the spacer blocks 3 is filled with several layers 4 of plastic foil which have metal deposited by vapor deposition at least on one side. A vacuum is created in the annular gap between the internal tube 1 and the external tube 2.

Figure 2:
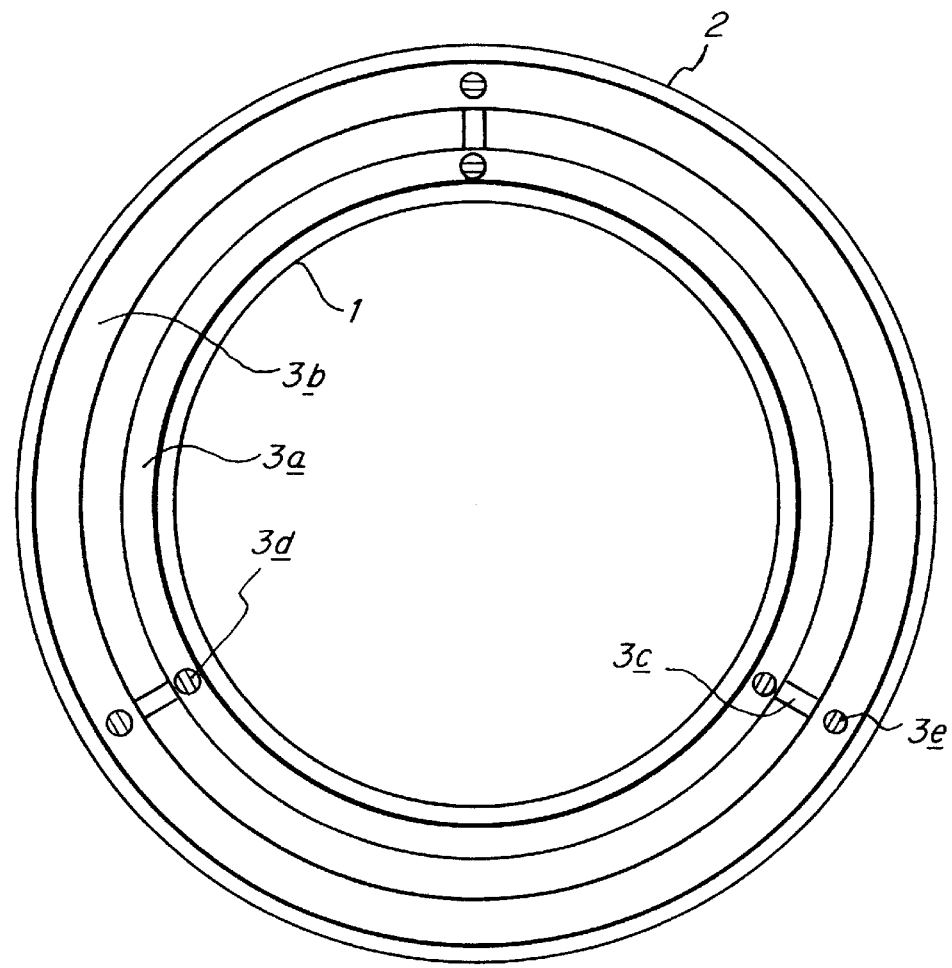
FIG. 2 is an axial cross-sectional view of the tubing system of FIG. 1.

FIG. 2 illustrates a section through the tubing system. The spacer block 3 is a component comprising an internal ring 3a which rests on the internal tube 1, and an external ring 3b that is placed against the inner surface of the external tube 2. The internal ring 3a is suspended inside the external ring 3b by means of holding elements 3c, which are uniformly distributed around the circumference. The holding elements 3c are attached to the internal ring 3a by means of suspension bolts 3d, and to the external ring 3b by means of suspension bolts 3e. The holding elements 3c ensure a concentric arrangement of the rings 3a and 3b, and thereby of the tubes 1 and 2 respectively.

The holding elements 3c are made of a high tensile strength and low heat conductivity fiber material, e.g. of glass fibers, carbon fibers or high-strength plastic fibers, e.g. polyaramid fibers. The fibers are so-called endless fiber elements, which are wound into a ring or an oval and embedded in a plastic resin matrix, e.g. of polyester or epoxide resin.

Depending on the number of windings and the size of the fibers' diameter, tensile strengths above 1000 N/mm$^2$ are achieved with a heat loss of 0.1 W and a distance of e.g. 25 mm between the attachment points (suspension bolts 3d and 3e). The use of the endless fiber elements, which are stretched between the two suspension bolts 3d and 3e, makes it possible to provide force without restriction to the holding elements 3c. The lengthwise extension of the holding elements 3c in the tube system is very small, so that it is possible to almost completely fill the annular gap with the mirror-coated insulation foils. This reduces the heat losses significantly by comparison to the massive spacer blocks with a high load capacity which were known until now.

Figure 3:
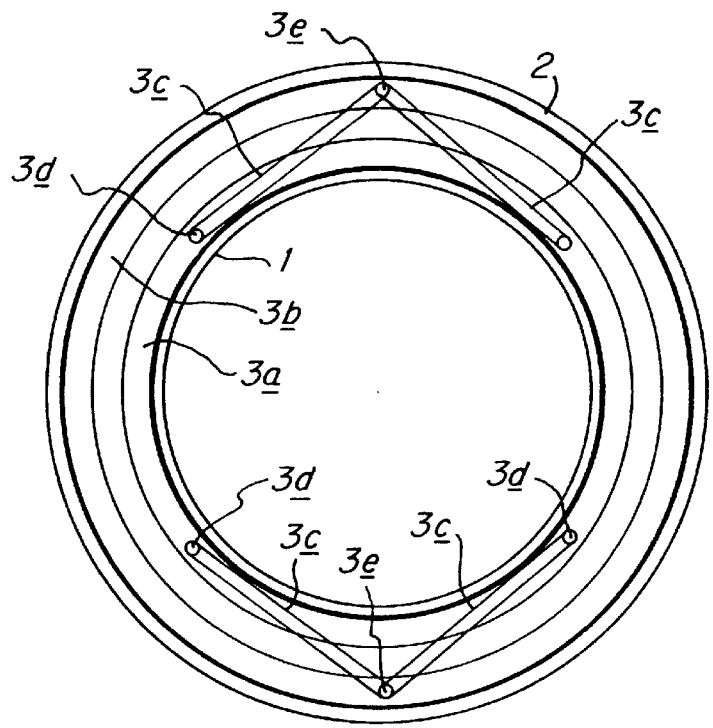
FIG. 3 is an axial cross-sectional view of a tubing system with a second type of suspension.

FIG. 3 illustrates another type of suspension. In this case, only two suspension bolts 3e are attached to the external ring 3b, and two holding elements 3c are secured to each of them.

Figure 4:
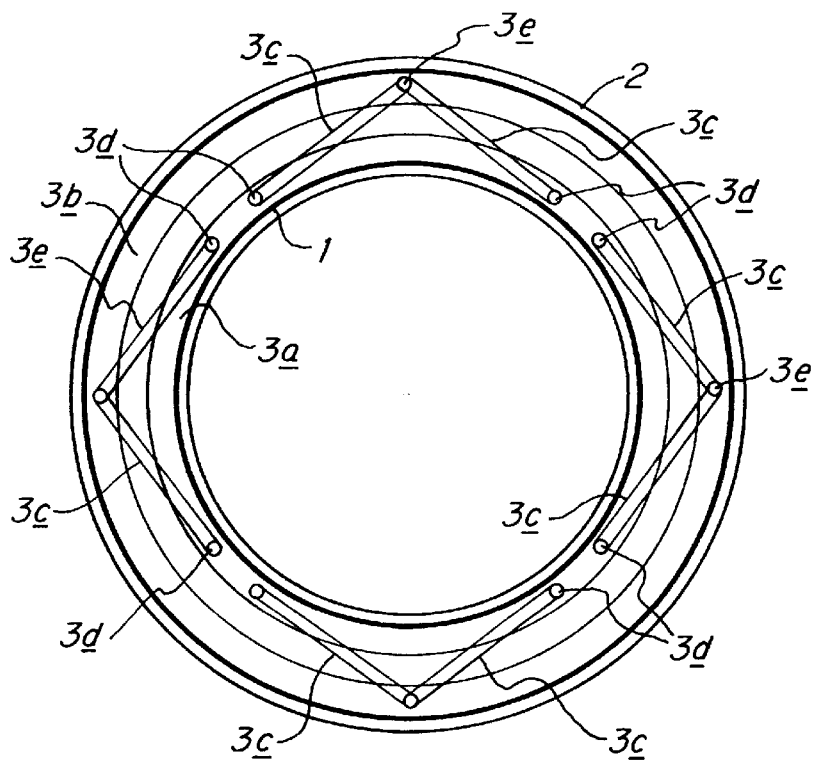
FIG. 4 is an axial cross-sectional view of a tubing system with a third type of suspension.

FIG. 4 illustrates another alternative suspension.

Figure 5:
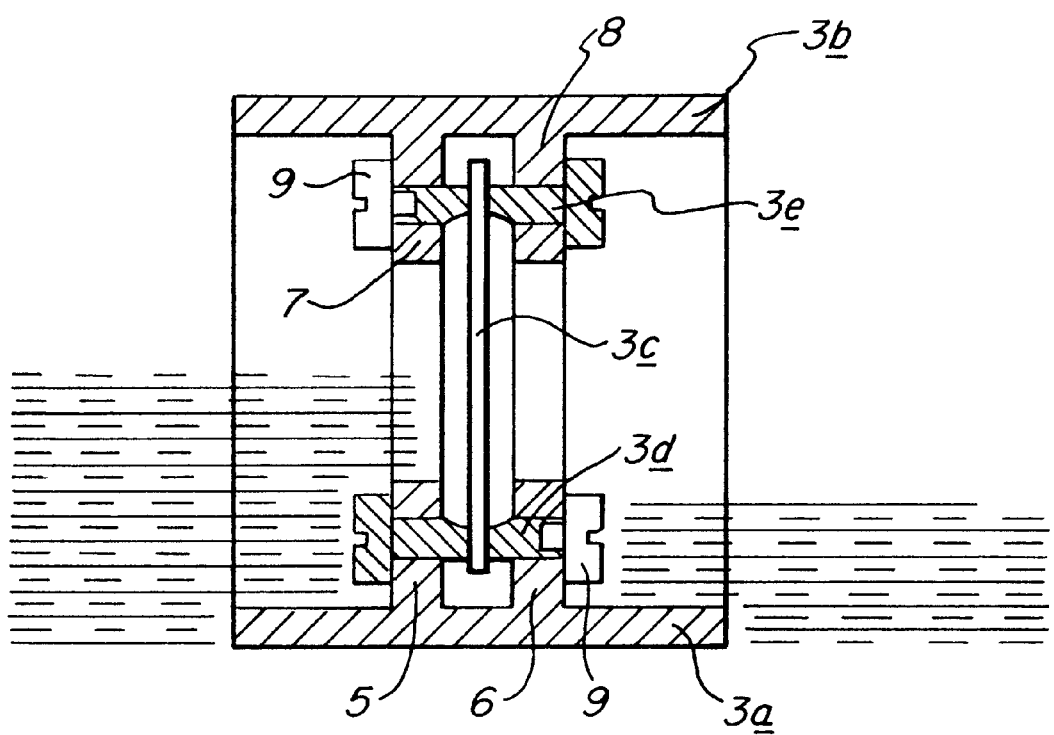
FIG. 5 is a longitudinal cross-sectional view of the spacer block.

FIG. 5 shows an enlarged view of the spacer block 3.

The suspension bolts 3d are held by two ribs 5 and 6 that are spaced apart from each other, namely in holes in the ribs 5 and 6 which have no reference numeral designation. The suspension bolts 3e are held in the same way by the ribs 7 and 8. The ends of both suspension bolts 3d and 3e are provided with an anti-torsion protection 9.

The shafts of the suspension bolts 3d and 3e are eccentric in the area where the holding elements 3c are located, so that by turning the suspension bolts 3d and/or 3e, the internal ring 3a and thereby the internal tube 1 can be placed in a precisely concentric position with respect to the external tube 2.

Since the described conduit with the corrugated internal tube 1 and the corrugated external tube 2 is very flexible, such tubes can be manufactured in long lengths and can be wound and stored on transportation reels like electrical cables. It is therefore necessary for production reasons that the spacer blocks 3 are able to be mounted laterally onto the internal tube 1.

In addition in a not illustrated manner, both the internal ring 3a and the external ring 3b can be provided with a slot of a width designed so that the slot can overlap the internal tube 1, and the spacer block 3 rests securely on the internal tube 1.

Another possibility is that the spacer block 3 is built in two halves which are attached to each other by a hinge-type connection e.g., or can be assembled as the spacer block 3 e.g. by means of a snap mechanism.

The spacer block of the invention is very well suited for so-called superconductor cables. In that case the internal tube 1 has a conductor made of superconducting material.

Another advantageous application is a concentric tube system of two corrugated metal tubes for the transportation of low temperature media. Such a tube system comprises for example an internal corrugated tube with an inside diameter of 127 mm and an outside diameter of 143 mm. The external corrugated tube has an inside diameter of 200 mm and an outside diameter of 220 mm. The distance between the spacer blocks is 1 m. The space between the spacer blocks is filled with a so-called superinsulation (several layers of a metal that is vapor-deposited on a plastic foil), and is finally placed under vacuum. A heat loss of less than 0.5 W/m of tube length was achieved with such an arrangement when the internal tube contained liquid nitrogen. When the tube system was bent at a radius of 2.5 m while the internal tube was cooled, no shifting of the internal tube could be observed inside the external tube.

The embodiments described above admirably achieve the objects of the invention. However, it will be appreciated that departures can be made by those skilled in the art without departing from the spirit and scope of the invention which is limited only by the following claims.

What is claimed is:

1. A spacer block for an elongated substrate within an elongated tube, comprising:
   (a) an internal ring which surrounds the elongated substrate and has an outside diameter;
   (b) an external ring which is surrounded by the elongated tube and has an inside diameter, the inside diameter of the external ring is larger than the outside diameter of the internal ring; and
   (c) at least three uniformly spaced spoke-type elements of fiber material interconnecting the internal ring and the external ring.

2. A spacer block as claimed in claim 1, wherein the elements are endless fiber elements chosen from a group consisting of carbon fibers and glass fibers, which are embedded in a resin.

3. A spacer block as claimed in claim 1, wherein the elements are made of individual fibers wound into a ring.

4. A spacer block as claimed in claim 1, wherein the elements are made of individual fibers wound into an oval.

5. A spacer block as claimed in claim 1, further including first and second bolts for each of the elements, the first bolt is attached to the external ring and the second bolt is attached to the internal ring.

6. A spacer block as claimed in claim 5, wherein the internal ring has two ribs spaced apart from each other, the two ribs of the internal ring point radially outward and extend in a circumferential direction along the internal ring, the external ring has two ribs spaced apart from each other, the two ribs of the external ring point radially inward and extend in a circumferential direction along the external ring, and the first bolts extend through holes in the two ribs of the internal ring, the second bolts extend through holes in the two ribs of the external ring.

7. A spacer block as claimed in claim 1, wherein the internal ring and the external ring both have a slot, each slot having a width dimensionally so that the spacer block can be installed laterally on the substrate.

8. A spacer block as claimed in claim 1, wherein the spacer block is made in two pieces.

9. A coaxial tube system for transporting low temperature media, comprising:
   (a) an elongated substrate comprising a corrugated inner metal tube;
   (b) an elongated tube comprising a corrugated outer metal tube surrounding the corrugated inner metal tube to form an annular gap therebetween, the annular gap being under vacuum; and
   (c) a spacer block comprising:
      (i) an internal ring which surrounds the elongated substrate and has an outside diameter;
      (ii) an external ring which is surrounded by the elongated tube and has an inside diameter, the inside diameter of the external ring is larger than the outside diameter of the internal ring; and
      (iii) at least three uniformly spaced spoke-type elements of fiber material interconnecting the internal ring and the external ring.

* * * * *